(12) United States Patent
Gorken et al.

(10) Patent No.: US 7,393,462 B2
(45) Date of Patent: Jul. 1, 2008

(54) PROCESS AND REAGENT FOR SEPARATING FINELY DIVIDED TITANIFERROUS IMPURITIES FROM KAOLIN

(75) Inventors: Abdul Gorken, Stratford, CT (US); Lino G. Magliocco, Shelton, CT (US); D. R. Nagaraj, Ridgefield, CT (US); Alan S. Rothenberg, Wilton, CT (US); S. A. Ravishankar, Shelton, CT (US)

(73) Assignee: Cytec Technology Corp., Wilmington, DE (US)

( * ) Notice: Subject to any disclaimer, the term of this patent is extended or adjusted under 35 U.S.C. 154(b) by 377 days.

(21) Appl. No.: 10/844,745

(22) Filed: May 13, 2004

(65) Prior Publication Data

US 2005/0252834 A1 Nov. 17, 2005

(51) Int. Cl.
*B03D 1/01* (2006.01)
*B03D 1/008* (2006.01)
*B03D 1/012* (2006.01)

(52) U.S. Cl. .......................................... 252/61; 209/166

(58) Field of Classification Search ................. 209/166, 209/167; 252/61
See application file for complete search history.

(56) References Cited

U.S. PATENT DOCUMENTS

| | | | | |
|---|---|---|---|---|
| 2,660,303 | A | 11/1953 | Haseman | 209/5 |
| 2,990,958 | A | 7/1961 | Greene et al. | 209/166 |
| 3,371,988 | A | 3/1968 | Maynard et al. | 23/110 |
| 3,450,257 | A | 6/1969 | Cundy | 209/5 |
| 3,701,417 | A | 10/1972 | Mercade | 209/5 |
| 3,837,482 | A | 9/1974 | Sheridan, III | 209/5 |
| 3,862,027 | A | 1/1975 | Mercade | 209/5 |
| 3,979,282 | A | 9/1976 | Cundy | 209/166 |
| 4,472,271 | A | 9/1984 | Bacon, Jr. | 209/167 |
| 4,492,628 | A | 1/1985 | Young et al. | 209/5 |
| 4,629,556 | A | 12/1986 | Yoon et al. | 209/166 |
| 4,661,342 | A * | 4/1987 | Yamazaki et al. | 424/54 |
| 4,871,466 | A | 10/1989 | Wang et al. | 252/61 |
| 4,929,343 | A | 5/1990 | Wang et al. | 209/166 |
| 5,237,079 | A | 8/1993 | Wang et al. | 544/103 |
| 5,522,986 | A | 6/1996 | Shi et al. | 209/166 |
| 5,535,890 | A | 7/1996 | Behl et al. | 209/5 |
| 5,685,899 | A | 11/1997 | Norris et al. | 106/487 |
| 5,810,998 | A | 9/1998 | Arrington-Webb et al. | 209/166 |
| 6,041,939 | A | 3/2000 | Shi et al. | 209/5 |
| 6,145,667 | A | 11/2000 | Rothenberg et al. | 209/166 |
| 6,200,377 | B1 | 3/2001 | Basilio et al. | 106/486 |
| 6,378,703 | B1 | 4/2002 | Mathur et al. | 209/166 |
| 6,390,301 | B1 | 5/2002 | Nagaraj et al. | 209/5 |

OTHER PUBLICATIONS

McCutcheon's Emulsifiers and Detergents International vol. 1 (2003).

* cited by examiner

*Primary Examiner*—Thomas M Lithgow
(74) *Attorney, Agent, or Firm*—Fran Wasserman

(57) ABSTRACT

A mineral beneficiating reagent containing an alkyl hydroxamic acid or salt thereof and a nonionic surfactant. The alkyl hydroxamic acid or a salt thereof is represented by the formula:

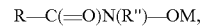

wherein R is linear or branched C2-C18 alkyl, linear or branched C2-C18 alkenyl, C6-C20 aryl or substituted aryl, C7-C26 aralkyl or substituted aralkyl; R" is H, C1-C12 alkyl or aralkyl; M is hydrogen, an alkali metal, or an ammonium cation represented by $N^+(A,B,C,D)$ wherein each of A,B,C, D, respectively, are H or C1-C6 alkyl or benzyl radicals. The nonionic surfactant can be any known nonionic surfactant, including but not limited ethoxylated alcohols, esters, ethoxylated acids, ethoxylated (alkyl) phenols, alcanolamides, polyethylene oxide copolymers and mixtures thereof.

22 Claims, No Drawings

PROCESS AND REAGENT FOR SEPARATING FINELY DIVIDED TITANIFERROUS IMPURITIES FROM KAOLIN

FIELD OF INVENTION

This invention relates to a process and reagent for treating commercially important mineral orebodies, such as Kaolin clay, to brighten them by removing colored impurities, and more particularly, to a hydroxamate-based reagent and processes which utilize the reagent in order to improve the separation efficiency of the colored impurities from kaolin clay in beneficiation processes such as selective flocculation or flotation.

BACKGROUND OF THE INVENTION

Kaolin crude originates from sedimentary deposits found in such locations as the state of Georgia in the United States and Brazil. Kaolin, containing largely the mineral kaolinite, is very widely used in paper coating and filling. In the United States, kaolin pigment production was nearly 7.5 million tons in 2003 generating an estimated revenue close to $1.6 billion. Upgrading the kaolin purity so that it can be used for producing premium brightness products is of particular importance. The paper market trend is moving towards producing thinner paper grades with the same properties of a thicker paper in terms of opacity and print fidelity resulting in two grades of kaolin which are growing at a fast rate. The two grades are (1) narrow particle engineered grade kaolin and (2) glossing grade kaolin both of which require premium brightness (90-91 GE Brightness). In order to achieve this high level of brightness it is necessary to remove colored impurity minerals such as titanium and iron based impurities from the kaolin.

There are several beneficiation techniques that are employed in the industry to remove the impurities, such as size classification methods, magnetic separation, flotation and selective flocculation. These beneficiation techniques, regarded as wet processes, remove colored titanium and iron based impurities. As a first step, kaolin crude is initially dispersed in water, degritted (process in which coarse particles and impurities greater than 37-44 micron are removed) and then the resulting slurry is subjected to beneficiation.

Titanium and iron impurities such as rutile, anatase, hematite and pyrite can sometimes possess weak magnetic susceptibility. In such cases High Intensity Magnetic Separation (HIMS) process can be used to remove the magnetic impurity particles. However, the method is not efficient enough to capture submicron sized magnetic particles and therefore limits the capability of magnetic separation in producing high brightness kaolin.

Froth flotation is another process for removing colored titaniferrous impurities. Here the discoloring impurities are selectively hydrophobized by the addition of a collector. Examples of such collectors include fatty acids such as tall oil fatty acid, alkyl sulfonates, alkyl hydroxamate (AHX) and mixtures thereof. After the addition of the collector, the slurry is conditioned or mixed prior to flotation. After conditioning the hydrophobized particles are levitated to the surface—the air/water interface—by means of air bubbles that are injected at the bottom of the flotation cell. U.S. patents that describe removing colored impurities by flotation include U.S. Pat. Nos. 3,979,282; 3,450,257; 4,472,271; 4,492,628; 4,629,556; 5,522,986; 5,685,899; and 5,810,998. A variation of froth flotation using carrier particles such as calcium carbonate is described in U.S. Pat. No. 2,990,958.

U.S. Pat. No. 4,871,466 describes a method of producing alkyl hydroxamic acid collectors and U.S. Pat. Nos. 4,629,556 and 6,378,703 each describe a froth flotation method for beneficiating kaolin using alkyl hydroxamic acids.

Selective flocculation is another well known beneficiation process. Normally, the flocculant is initially adsorbed onto and bridges between mineral particles of similar composition thus binding the particles together. The bonded particle aggregates then form larger aggregates or flocs which settle out of the suspending medium by gravity. Flocculants can be natural products such as starch, guar gum and alginates or synthetic polymers such as polyacrylamides, polyacrylates and polyethylene oxides. Selective flocculation is an effective process for recovering fine to ultrafine minerals that respond poorly to conventional beneficiation processes such as flotation and magnetic separation. The successful use of selective flocculation on mixtures of fine mineral particles such as kaolin clays, iron-bearing minerals, phosphates, potash, copper ores and coal is known in the industry.

Selective flocculation involving the activation of the impurity with polyvalent cations, as described in U.S. Pat. Nos. 3,371,988; 3,701,417; 3,837,482 and 3,862,027), conditioning with ammonium salt, as described in U.S. Pat. No. 4,604, 369) or with fatty acid and polyvalent cations (U.S. Pat. No. 5,535,890) and then selectively flocculating the impurities with charged anionic water soluble polymers, usually polyacrylamides.

Specifically, U.S. Pat. No. 5,535,890 describes a selective flocculation process for purifying the kaolin clay containing a colored impurity which involves selective flocculation of the colored impurity as a dense dun colored thick mass separated as a lower layer and a white layer of purified kaolin that is low in colored impurities. The reagents used include typical dispersants such as sodium silicate, sodium polyacrylate, sodium hexameta phosphate, divalent metal ions, fatty acid and high molecular weight anionic polymer. The process suffers from low recoveries or yields.

U.S. Pat. Nos. 6,390,301 and 6,041,939 each describe a similar process for beneficiating kaolin by a selective flocculation process employing an alkyl hydroxamic acid and flocculating agent.

U.S. Pat. No. 6,200,377 describes an improved process for the beneficiation of kaolin crude that contains minerals that chelate with hydroxamates. The use of a silicon containing compound in combination with hydroxamate results in a more effective separation of minerals that chelate with hydroxamate. Also described is the addition of a silicon-containing compound to increase the interaction of the hydroxamates with the chelatable minerals, which results in a more effective beneficiation.

Selective flocculation has also been used to beneficiate other mixtures of mineral particles. Iron-bearing ores, specifically taconite, are commercially processed using selective flocculation. The iron ore is ground and then dispersed with caustic and sodium silicate. The dispersed ground ore is then selectively flocculated with a corn starch flocculant to separate hematite, an iron oxide mineral.

Phosphate minerals are beneficiated using selective flocculation to separate them from the associated clays, as described in U.S. Pat. No. 2,660,303. Potash is also beneficiated by selective flocculation using a anionic polyacrylamide flocculant and/or ethoxylated alkylamic alkylguanidine complex. Another selective flocculation process to beneficiate alkaline carbonate minerals, phosphate minerals, zeolites and bauxites is described by U.S. Pat. No. 5,535,890. In this process, fatty acids and polyvalent cations are used to recondition the mineral suspension. Another beneficiation process involves leaching the kaolin clay with iron-reducing reagents such as zinc or sodium hydrosulfite. This leaching method is however, limited to removing iron contaminants only. Other known leaching reagents and/or processes are not currently economical for removing titanium impurities.

Due to the limitations of these various beneficiation processes to separate certain minerals from mixtures of minerals, such as the discoloring impurities in kaolin clays, there is a need in the industry for a process that is more effective and efficient.

SUMMARY OF THE INVENTION

It is therefore an objective of this invention to provide improved novel reagents and mineral beneficiating processes using those novel reagents in order to achieve higher beneficiation efficiencies. It is also expected that certain types of kaolin crude sources that are currently not treatable with the existing reagents and processes may be treated with the subject novel reagents.

The invention is directed to novel mineral beneficiating reagents comprising an alkyl hydroxamic acid or salt thereof and a nonionic surfactant. The novel reagents provide for improved selectively in removing impurities from mineral substrates.

Specifically, this invention provides mixtures of alkyl hydroxamate (hydroxamic acid and/or salts thereof) and neutral nonionic surfactants that preferentially and more effectively activates or adsorbs onto the colored impurities thereby increasing the separation efficiency. These are subsequently either separated by flotation using air or nitrogen in a conventional or column type float cell or are flocculated by a high molecular weight organic flocculant such as anionic polyacrylamide or hydroxamated polyacrylamide in a hydroseparator or thickener type device.

The present invention provides an improved process for the beneficiation of hydroxamate-chelatable minerals such as those containing titanium, copper, iron, tin, manganese, yttrium, cerium, lanthanum, niobium, calcium or tantalum.

In that capacity, the invention is directed to a method of beneficiating mineral substrates by using a reagent comprised of an alkyl hydroxamic acid or salt thereof and a nonionic surfactant and an organic flocculant to separate unwanted impurities by a process of selective flocculation or froth flotation.

DETAILED DESCRIPTION OF THE INVENTION

The reagent according to the present invention comprises a mixture of alkyl hydroxamic acid or a salt thereof and a nonionic surfactant. The alkyl hydroxamic acid or a salt thereof is represented by the formula:

wherein R is linear or branched C2-C18 alkyl, linear or branched C2-C18 alkenyl, C6-C20 aryl or substituted aryl, C7-C26 aralkyl or substituted aralkyl; R" is H, C1-C12 alkyl or aralkyl; M is hydrogen, an alkali metal, or an ammonium cation represented by $N^+(A,B,C,D)$ wherein each of A,B,C,D, respectively, are H or C1-C6 alkyl or benzyl radicals. In a preferred embodiment, R=linear or branched C8-C10 alkyl; R"=H; and each of A,B,C and D are H.

The hydroxamic acid or salt thereof (also referred to as alkyl hydroxamate acid or hydroxamic salt (AHX)) can be manufactured in accordance with any known process in the art, an example of which is described in U.S. Pat. No. 4,871,466, hereby incorporated herein in its entirety. Typically, the alkyl hydroxamic acid or salt thereof is present in the reagent in an amount between 10% and 30% by weight, based on the weight of the reagent.

The nonionic surfactant can be any nonionic surfactant. A listing of commercially available nonionic surfactants can be found in McCutcheon's Emulsifiers and Detergents International Vol. I (2003). Preferred nonionic surfactants include ethoxylated alcohols, ethoxylated acids, esters, ethoxylated amines, ethoxylated (alkyl) phenols, polyethylene oxide copolymers, and alcanolamides and mixtures thereof. Preferred examples of ethoxylated alcohols suitable for use in the present invention include, but are not limited to, ethoxylated C9-C20 linear alcohols. Preferred examples of ethoxylated acids include, but are not limited to, ethoxylates of C8-C20 aliphatic acids. Preferred examples of ethoxylated (alkyl) phenols include but are not limited to, ethoxylated (alkyl) phenols having the formula $R\text{-}Ph\text{-}O(CH_2CH_2O)_xH$, where R=H, or C1-C15, x=1-20, especially preferred ethoxylated alkyl phenols include those where R=C9. Ethoxylated nonylphenol is an example of such a preferred ethoxylated alkyl phenol. Preferred examples of esters useful in the present invention include, but are not limited to, esters derived from linear or branched mono or polyhydric alcohols with aliphatic or aromatic acids, examples of which include C10-C20 alkyl esters of glycol or glycerol and C10-C20 allyl esters of sorbitan or sorbitol, eg. sorbitan monooleate. Optionally, the esters can be ethoxylated, eg. ethoxylated sorbitan monosterate. Preferred examples of ethoxylated amines include, but are not limited to, ethoxylated C10-C20 aliphatic amines and preferred alcanolamides include, but are not limited to, diethanolamides of C8-C20 aliphatic acids.

The ratio of non-ionic surfactant to hydroxamate in the reagent of the present invention is from about 1:100 to about 100:1 and preferably from about 1:20 to about 1:1.

The mineral beneficiating reagent according to the present invention can further comprise a long chain fatty acid, such as tall oil fatty acid or natural or synthetic sulfonate. In reagents that further comprise a long chain fatty acid, the ratio of hydroxamic acid or salt thereof to long chain fatty acid is preferably from about 1:10 to about 10:1 and more preferably from about 2:1 to about 1:2. The novel mineral processing beneficiating reagents according to the present invention can be manufactured by mixing the alkyl hydroxamate acid or hydroxamic salt with the nonionic surfactant in any suitable vessel until a uniformly blended product is obtained. The mixing temperature is determined by the dissolution efficiency of the mixing procedure. Often mixing may be accomplished at 25° C., although warming may be necessary to accelerate dissolution where the melting point of the surfactant is higher than 25° C. The weight ratio of non-ionic surfactant to hydroxamate or hydroxamic salt in the reagent of the present invention is from about 1:100 to about 100:1 and preferably from about 1:20 to about 20:1.

Mineral Beneficiation

The present invention is further directed to a method for the selective separation of impurities from a finely divided mixture of mineral particles, such as for example kaolin clay. The method comprises the sequential steps of conditioning an aqueous slurry of the mixture of mineral particles by adding to it in an amount that is from about 0.1 to about 10 pounds per ton of mixture, a reagent comprising an alkyl hydroxamic acid or salt thereof and nonionic surfactant. In the reagent the ratio of non-ionic surfactant to hydroxamic acid or salt thereof is preferably from about 1:100 to about 100:1. The conditioned slurry is then subjected to a mineral beneficiation process wherein the impurities are separated from the finely divided mixture.

Selective Flocculation

In a preferred embodiment, the invention is directed to an improved method of using selective flocculation to beneficiate a mineral orebody. The orebody can be any orebody from which hydroxamate chelatable impurities such as iron or titanium oxides must be removed. Examples of such orebodies include, but are not limited to, typical kaolin crude obtained from the eastern Georgia clay belt may contain about 3.0% or more of $TiO_2$ impurities by weight. The orebody is firstly crushed and dispersed in water in the presence of a dispersing agent such as sodium silicate, sodium hexametaphosphate and/or organic dispersants like polyacrylate and combinations thereof at a dosage of between 1-10 lbs per ton. The preferred dispersant here is sodium silicate. A pH modifier may be added to achieve a pH is the range of 5-12, preferably 8-10.5. An inorganic salt may also be added as a processing aid. Examples of such inorganic salts include, but are not limited to, calcium chloride, sodium chloride and ammonium chloride. Blunging is carried out at 40-70% solids, preferably 50-65% solids using high energy devices which are well known in the industry. An improved reagent in accordance with the present invention containing alkyl hydroxamate (AHX) and a nonionic surfactant is added during the blunging stage in order to ensure complete adsorption onto impurity particles. Complete adsorption/activation of the alkylhydroxmate reagent is ensured by conditioning using a high speed energy disperser and increasing the temperature of the slurry. The conditioned slurry is subjected to the specific beneficiation process as outlined below. In a particularly preferred embodiment, the dose of the reagent in the present invention ranges from about 0.1 to about 10 lbs per ton and preferably from about 1 to about 5 lbs per ton and most preferably from about 2 to about 5 pounds per ton of dispersed mineral orebody.

Flotation Process

The separation of impurities by flotation can be carried out by procedures well known to those skilled in the art such as described in U.S. Pat. No. 4,629,556. In a further preferred embodiment, the reagent according to the present invention is added at any stage prior to or during the flotation stage. The dose of reagent added ranges from about 0.1 to about 20 lbs per ton and preferably about 1 to about 5.0 lbs per ton and most preferably from about 2 to about 4 pounds per ton of kaolin or mineral mixture.

Surprisingly the combination of alkyl hydroxamic acid or hydroxamic salt reagent and nonionic surfactant increases the activation of the impurity minerals, thus resulting in improved separation efficiency as is shown in the examples below.

The present invention is further illustrated by the following non-limiting examples that are illustrative of certain embodiments.

EXAMPLES

Example A

Preparation of the Hydroxamate/Nonionic Surfactant Mixtures

Twenty two and one half (22.5) parts of hydroxamic acid prepared as described in U.S. Pat. No. 4,871,466 is placed in a suitable glass container equipped with a stir bar and magnetic stirring mechanism. 2.5 parts of the nonionic surfactant as shown in Table I is then added and stirred until a uniform clear solution is obtained. A typical product contains 29.6 percent by weight hydroxamic acid.

Examples 1-10

Selective Flocculation

A sample of typical kaolin crude, feed to an existing commercial selective flocculation plant located in the eastern part of the state of Georgia clay belt is used in these examples. The feed material is composed of various blended run of mine ores.

The ore feed used in these examples contains about 2.5% $TiO_2$ by weight and has a particle size distribution representing about 90% finer than 2 microns. The as received material contains 19.2% moisture. Reagent additions reported in these examples are based on dry weight basis unless otherwise indicated.

The entire sample is crushed and homogenized using a laboratory hammer mill with ¼ inch discharge grate. The crushed ore is mixed thoroughly by coning and quartering and followed by splitting into representative test charges using rotary splitter. Test charges are adjusted to 300 g dry basis based on the original moisture content of the kaolin clay sample.

For each test, a randomly selected test charge is agitated (or blunged) in a Waring blender at a nominal 60% solid content. In the following examples, Na silicate dispersant at 1.0 kg/t dosage and 0.25 kg/t of NaOH to obtain slurry pH of about 8.5 to 9.0 is used. Blunging time is fixed at 6 minutes.

In the following examples, the blunged clay slurry is conditioned at the same blunging solids (60% solids) with the reagents as prepared in Example A above, for an additional 10 minutes at the highest speed settings of the Waring blender (around 10,000 rpm). The dosage of this reagent is 3.0 lbs/ton. The pH of the conditioning slurry is maintained between 8.5 and 9.0. Caustic solution (10% by weight) is used to adjust the slurry pH into the aforementioned range when necessary. The temperature of the slurry after conditioning is in the range Of 40-70 degrees C.

After the conditioning step, the kaolin clay slurry is diluted to 25% solids and transferred to a 2 liter beaker for sedimentation. The pulp is agitated mildly at a low rpm (200-400) mixing speed. An appropriate amount (10-20 grams per ton) of high molecular weight polyacrylamide flocculant (0.025% solution strength) is introduced into the mixing slurry in a controlled manner to allow hydrophobic colored impurity minerals to be flocculated selectively and settle to the bottom of the beaker as a distinct separate phase.

Settling time is fixed at 30 minutes allowing the majority of the colored impurity minerals to settle. After settling, the remaining upgraded kaolin clay suspended in slurry is siphoned out and separated from the settled colored impurity mass. The product slurry is weighed, sampled for percent solids determination and to calculate product yield. Product slurries are further sampled for $TiO_2$ and $Fe_2O_3$ assays to determine purity. Table I shows the results of using a nonionic surfactant (Ethox, Ethox Chemicals, Greenville, S.C.; Tergitol, Dow Chemical Co., Midland, Mich.; Neodol, Shell Oil Corp., Houston, Tex.; Surfonic, Huntsman Polymers Corp., Salt Lake City, Utah; Genepol, Stepan Corp., Northfield, Ill.) in combination with an alkyl hydroxamic acid on the removal efficiency of $TiO_2$ impurity.

TABLE I

Beneficiation by Selective flocculation

| Test | Surfactant Name | Surfactant Compostion | Surfactant HLB | % Yield | % TiO2 |
|---|---|---|---|---|---|
| Control | | No surfactant added | | 61.9 | 1.118 |
| Example 1 | Ethox ML-5 | Ethoxylated Fatty Acid MW-400 | | 56.4 | 0.415 |
| Example 2 | Ethox ML-9 | Ethoxylated Fatty Acid | | 57.1 | 0.509 |
| Example 3 | Ethox ML-14 | Ethoxylated Fatty Acid | | 57.0 | 0.375 |
| Example 4 | Tergitol 15-S-3 | Ethoxylated Secondary C11-C15 Alcohol | 8.30 | 58.1 | 0.420 |
| Example 5 | Tergitol 15-S-9 | Ethoxylated Secondary C11-C15 Alcohol | 13.10 | 57.8 | 0.399 |
| Example 6 | Neodol 23-3 | Ethoxylated Primary C12-C13 Alcohol | 7.90 | 59.7 | 0.462 |
| Example 7 | Neodol 91-6 | Ethoxylated Primary C9-C11 Alcohol | 12.50 | 55.0 | 0.375 |
| Example 8 | Surfonic N-95 | Ethoxylated NonylPhenol | 12.90 | 56.3 | 0.465 |
| Example 9 | Genapol-26-L-1 | Ethoxylated Linear alcohol | 3.70 | 60.0 | 0.550 |
| Example 10 | Surfonic L-24-7 | Ethoxylated Linear alcohol | | 51.4 | 0.534 |

Examples 11-12

Beneficiation by Flotation

A sample of typical kaolin crude, feed to an existing commercial selective flocculation plant located in the eastern Georgia clay belt is used in these examples. The feed material is composed of various runs of mine ore.

The ore feed used in these examples contains about 2.5% $TiO_2$ by weight and has a particle size distribution representing about 90% finer than 2 microns. The as received material contains 19.2% moisture. Reagent additions are reported in these examples based on dry weight basis unless otherwise indicated.

The entire sample is crushed and homogenized using a laboratory hammer mill with ¼ inch discharge grate. The crushed ore is mixed thoroughly by coning and quartering and followed by splitting into representative test charges using rotary splitter. Test charges are adjusted to 300 g dry basis based on the original moisture content of the kaolin clay sample.

For each test, a randomly selected test charge is blunged in a Waring blender at nominal 60% solids. In these examples, Na silicate dispersant was used at 1.0 kg/t dosage and 0.25 kg/t of caustic to obtain slurry pH of about 8.5 to 9.0 is used. Blunging time is fixed at 6 minutes.

The purpose of the blunging process is to disperse the kaolin clay and colored impurity minerals. Efficient dispersion is requirement for the following conditioning step. The subject, reagents according to the present invention are normally more effective in imparting hydrophobic surface coverage to colored impurity minerals selectively when they are contacted with fully dispersed clay slurries. The colored impurity minerals are then floated away selectively from the hydrophilic kaolin clay values in the subsequent froth flotation separation step.

In the following examples, the blunged clay slurry is conditioned at the same blunging solids (60% solids) with the reagent of the present invention for an additional 10 minutes at the highest speed settings of the Waring blender. The dosage for the reagent is 3.0 lbs/ton. The pH of the conditioning slurry is maintained between 8.5 and 9.0. Caustic solution (10% by weight) is used to adjust the slurry pH in aforementioned range when necessary.

After the conditioning step, the kaolin clay slurry is diluted to 25% solids and transferred to a Denver flotation cell for flotation separation. Air is introduced into the flotation slurry in a controlled manner to collect hydrophobic colored impurity minerals and separate (float off) them into the froth fraction.

Flotation time is carried out till completion (to a point where most of the colored impurity minerals are removed and froth is diminished to a level that it can not be removed effectively). It takes normally 20 to 30 minutes to reach completion in the following examples.

After flotation, the remaining upgraded kaolin clay slurry in the flotation cell is weighed, sampled for percent solids determination to calculate product yield. Product slurries are further sampled in order to determine $TiO_2$ and $Fe_2O_3$ assays.

Product $TiO_2$ and $Fe_2O_3$ assays and product weight yield are used to compare the efficacy of the reagents in the following examples.

The same test procedure is used in the following three examples.

| Example No. | Reagent | Product Yield % | Product Assay TiO$_2$ % | Product Assay Fe$_2$O$_3$ % |
|---|---|---|---|---|
| Control B | No surfactant added | 46.4 | 0.827 | 1.055 |
| 12 | Ethox ML 5 | 62.8 | 0.448 | 1.156 |
| 13 | Ethox ML 5 | 53.0 | 0.341 | 1.106 |

What is claimed:

1. A mineral beneficiating reagent comprising an alkyl hydroxamic acid and a nonionic surfactant, wherein said hydroxamic acid is present in an amount between 10% and 30% by weight based on the weight of the mineral beneficiating reagent and the ratio of non-ionic surfactant to hydroxamic acid is from about 1:20 to about 1:1.

2. The mineral beneficiating reagent in accordance with claim 1, wherein said hydroxamic acid is present in an amount between 20 wt. % and 30 wt. %, based on the weight of the mineral beneficiating reagent.

3. The mineral beneficiating reagent in accordance with claim 1, wherein said hydroxamic acid is present in an amount between 28 wt. % and 30 wt. %, based on the weight of the mineral beneficiating reagent.

4. The mineral beneficiating reagent in accordance with claim 1, wherein said alkyl hydroxamic acid is represented by the formula:

wherein R is linear or branched C2-C18 alkyl, linear or branched C2-C18 alkenyl, C6-C20 aryl or substituted aryl, C7-C26 aralkyl or substituted aralkyl; R" is H, C1-C12 alkyl or aralkyl; and M is hydrogen.

5. The mineral beneficiating reagent in accordance with claim 4, wherein R=linear or branched C8-C10 alkyl; and R"=H.

6. The mineral beneficiating reagent in accordance with claim 1, wherein the nonionic surfactant is selected from the group consisting of ethoxylated alcohols, esters, ethoxylated acids, ethoxylated (alkyl) phenols, alcanolamides, polyethylene oxide copolymers and mixtures thereof.

7. The mineral beneficiating reagent in accordance with claim 6, wherein the nonionic surfactant is an ethoxylated alcohol.

8. The mineral beneficiating reagent in accordance with claim 7, wherein the ethoxylated alcohols are selected from the group consisting of ethoxylated C9-C20 linear alcohols.

9. The mineral beneficiating reagent in accordance with claim 8, wherein the ethoxylated C9-C20 linear alcohol has a hydrophilic lyophilic balance from about 3 to about 14.

10. The mineral beneficiating reagent in accordance with claim 6, wherein the nonionic surfactant is an ethoxylated acid.

11. The mineral beneficiating reagent in accordance with claim 10, wherein the ethoxylated acids are selected from the group consisting of ethoxylates of C8-C20 saturated and unsaturated aliphatic acids.

12. The mineral beneficiating reagent in accordance with claim 6, wherein the nonionic surfactant is ethoxylated (alkyl) phenols.

13. The mineral beneficiating reagent in accordance with claim 12, wherein the ethoxylated (alkyl) phenols are selected from the group consisting of ethoxylated (alkyl) phenols having the formula $R\text{-}Ph\text{-}O(CH_2CH_2O)_xH$, where R=H, or C1-C15, x=1-20.

14. The mineral beneficiating reagent in accordance with claim 13, wherein the ethoxylated (alkyl) phenol is nonylphenol.

15. The mineral beneficiating reagent in accordance with claim 6, wherein the nonionic surfactant is an ester and is optionally ethoxylated.

16. The mineral beneficiating reagent in accordance with claim 15, wherein the ester is derived from linear or branched mono or polyhydric alcohols with saturated or unsaturated aliphatic or aromatic acids.

17. The mineral beneficiating reagent in accordance with claim 16, wherein the ester is selected from the group consisting of C10-C20 alkyl esters of glycol, C10-C20 alkyl esters of glycerol, C10-C20 esters of sorbitan or sorbitol, ethoxylates thereof and mixtures thereof.

18. The mineral beneficiating reagent in accordance with claim 1, further comprising a long chain fatty acid or natural or synthetic sulfonate.

19. The mineral beneficiating reagent in accordance with claim 18, wherein the ratio of hydroxamic acid or salt thereof to long chain fatty acid or natural or synthetic sulfonate is from about 1:10 to about 10:1.

20. The mineral beneficiating reagent in accordance with claim 19, wherein the ratio hydroxamic acid or salt thereof to long chain fatty acid is from about 2:1 to about 1:2.

21. The mineral beneficiating reagent in accordance with claim 20, wherein the long chain fatty acid is tall oil fatty acid.

22. The mineral beneficiating reagent in accordance with claim 1, wherein said hydroxamic acid is present in an amount of about 29.6 wt. %, based on the weight of the mineral beneficiating reagent.

* * * * *